United States Patent [19]

Bruckert et al.

[11] 4,159,291

[45] Jun. 26, 1979

[54] OUTLET MEANS FOR VAPOR-LIQUID CONTACTING TRAY

[75] Inventors: Walter Bruckert, Antwerp, Belgium; David W. Weiler, Burt, N.Y.

[73] Assignee: Union Carbide Corporation, New York, N.Y.

[21] Appl. No.: 888,221

[22] Filed: Mar. 20, 1978

Related U.S. Application Data

[63] Continuation-in-part of Ser. No. 825,169, Aug. 16, 1977, abandoned.

[51] Int. Cl.² .............................................. B01F 3/04
[52] U.S. Cl. .................................. 261/114 R; 202/158
[58] Field of Search .................. 261/97, 81, 110, 111, 261/113, 114 R, 114 A, 114 JP, 114 VT, 114 TC, DIG. 44, DIG. 72; 202/158

[56] References Cited

U.S. PATENT DOCUMENTS

| | | | |
|---|---|---|---|
| 1,770,221 | 7/1930 | Sweeny | 261/114 R |
| 2,061,830 | 11/1936 | Campbell | 261/113 |
| 2,639,130 | 5/1953 | Heere | 261/DIG. 72 |
| 3,410,540 | 11/1968 | Bruckert | 261/113 |
| 3,488,037 | 1/1970 | Prochazka et al. | 261/113 X |
| 3,784,175 | 1/1974 | Hirao et al. | 261/114 R |

FOREIGN PATENT DOCUMENTS

| | | | |
|---|---|---|---|
| 1416731 | 12/1975 | United Kingdom | 261/114 R |
| 1416732 | 12/1975 | United Kingdom | 261/114 R |

Primary Examiner—Richard L. Chiesa
Attorney, Agent, or Firm—Steven J. Hultquist

[57] ABSTRACT

Liquid discharge means for a vapor-liquid contacting tray having spout openings in the floor members of the downcomers. Lip means are provided with a wall segment which extends transversely beneath the spout openings associated with the lip means, whereby liquid in the downcomer flowing through the spout openings is vertically damped and given a horizontal velocity component by the lip means for dispersed flow of discharged liquid onto the active portion of tray surface area of an underlying tray.

14 Claims, 19 Drawing Figures

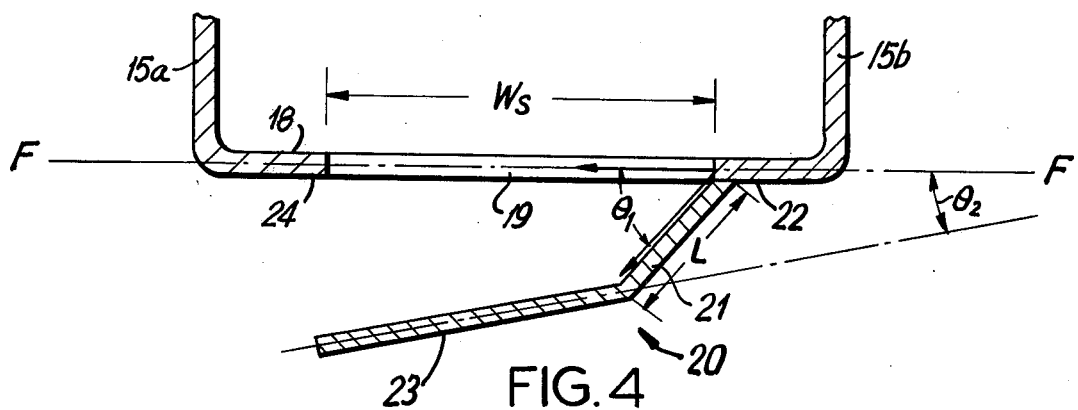
FIG. 4
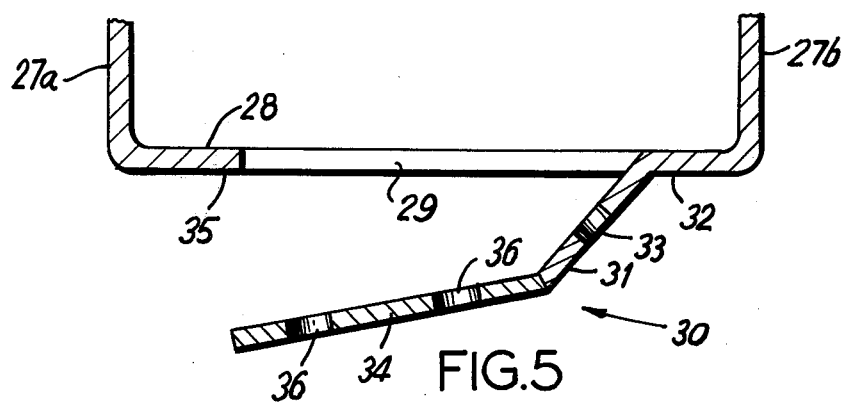
FIG. 5
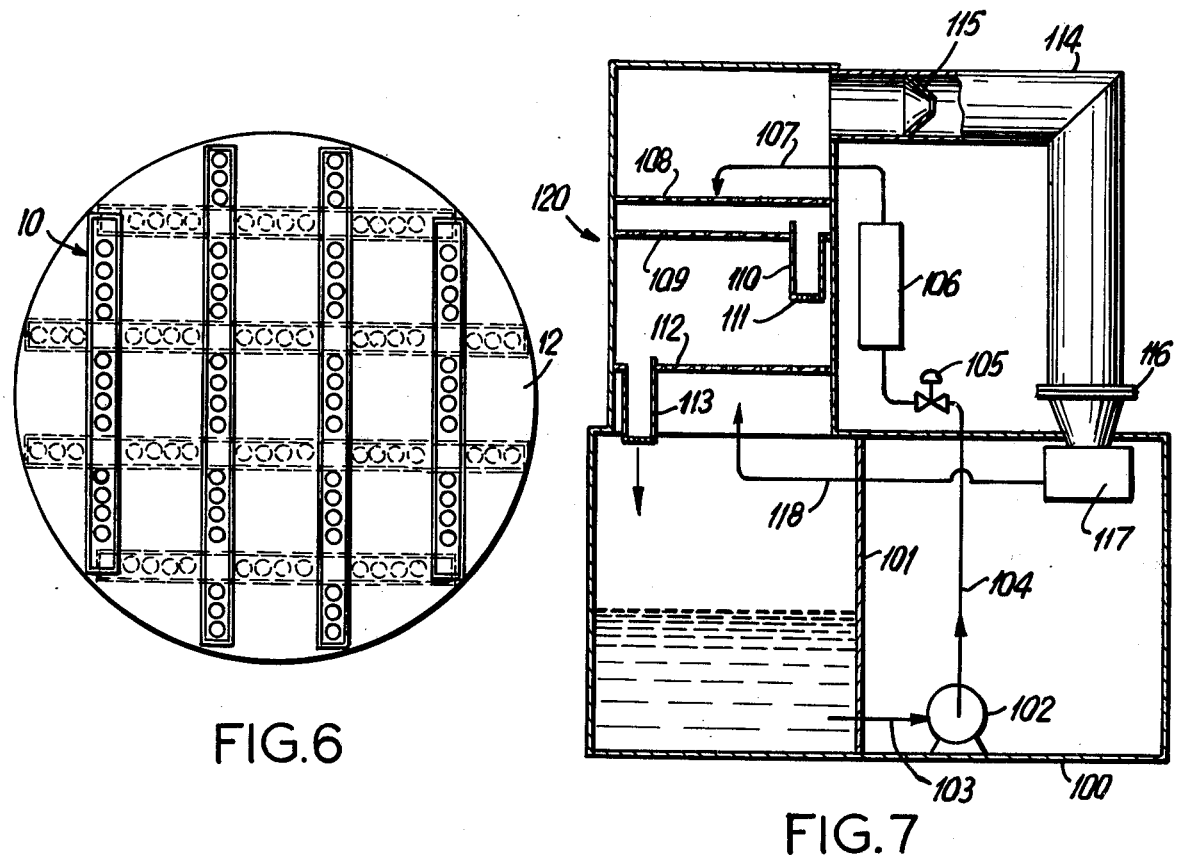
FIG. 6
FIG. 7

OUTLET MEANS FOR VAPOR-LIQUID CONTACTING TRAY

CROSS-REFERENCE TO RELATED APPLICATIONS

This is a continuation-in-part of U.S. application Ser. No. 825,169 filed Aug. 16, 1977, now abandoned.

BACKGROUND OF THE INVENTION

1. Field of the Invention

This invention relates to a liquid discharge means for a vapor-liquid contacting tray having spout openings in the floor members of the downcomers.

2. Description of the Prior Art

U.S. Pat. No. 3,410,540 to W. Bruckert discloses a vapor-liquid contacting tray of a type adapted for mounting in a vapor-liquid contacting column having a plurality of such trays vertically spaced apart from one another. The disclosed tray is suitable for use in contacting systems such as wash columns, stripping columns, distillation columns and the like. In this type of tray, perforated fluid contact means are provided as the active portion of the tray surface area, and narrow trough-like downcomers are spaced across the tray to provide separate perforated sections of the fluid contact means therebetween, the downcomers serving to transfer liquid to the next lower tray in the column.

In more specific detail, the Bruckert multiple downcomer tray includes perforated fluid contact means providing an active major portion of the tray surface area to support a two-phase fluid dispersion of vapor in liquid for mass exchange, and at least three narrow, trough-like downcomer means evenly spaced across the tray in parallel relation to each other and extending through the perforated fluid contact means as the sole liquid transfer means and comprising a minor portion of the tray surface area such that the fluid contact means is divided into sections of substantially equal surface area per unit length of adjacent downcomer means. Each downcomer means comprises two spaced longitudinal inlet edges each adjacent to a section of the active portion and extending across the tray and imperforate relatively long and deep longitudinal side walls and imperforate relatively short transverse end walls which define a discrete inactive portion of the tray surface area, provide an inlet end section for receiving a fraction of the two-phase fluid dispersion and permitting vapor to disengage therefrom, and provide an outlet end section for collecting disengaged liquid and discharging such disengaged liquid from the tray. Each downcomer means also comprises a liquid sealable outlet means which may suitably be constituted by a floor member attached to the outlet end section of the downcomer, having a multiplicity of spaced-apart spout openings (apertures) therein so constructed that a sealing effect against vapor penetration may be provided by a stable head loss of liquid passing therethrough such that a pool of disengaged liquid may be maintained in the downcomer means.

The above-described Bruckert multiple downcomer tray has been proven to be highly efficient and is widely used in practice as a result of its numerous desirable operating characteristics. The tray is capable of operating efficiently at high liquid flow rates without the problems of excessive entrainment, downcomer flooding, hydrostatic gradient, or high pressure drop. On the Bruckert tray, froth height (the height of the two-phase fluid dispersion of vapor in liquid on the active area of the tray surface) is controllable over wide liquid and vapor flow rates, thereby permitting high rangeability of the gas-liquid contacting system at reasonable vapor phase pressure drop. Furthermore, the hydraulic behavior of the Bruckert tray is accurately predictable. As a result of these operating characteristics, the Bruckert tray may be employed in a vapor-liquid contacting column having tray spacings, i.e., the vertical distance between adjacent contacting trays in the column, lower than is possible for other conventional trays such as those of the cross-flow or corrugated types. In this manner, the Bruckert trays provide more mass transfer capacity per unit column volume with lower power consumption than contacting columns containing such other conventional trays.

Despite the foregoing advantages, however, it has been observed that Bruckert multiple downcomer trays in operation are subject to the disadvantageous phenomenon of penetrative weeping. Penetrative weeping is caused by the impact of the liquid flowing from the downcomers of one tray in a contacting column to the active portion of tray surface area of an underlying tray. The momentum gained by the liquid in its fall adds to the hydrostatic head of the froth on the active portion of tray surface area of the underlying tray, thus producing a localized area of weeping. Weeping involves liquid flow through the gas flow openings of the active portion of tray surface area, in place of the vapor which would otherwise flow through such gas flow openings. Since weeping is synonymous with reduced vapor flow, the vapor that is prevented from passing through the penetrative weeping zone must pass through another part of the tray surface area, thereby creating increased superficial vapor velocities in these other zones. In addition, any liquid which weeps through the tray surface area active portion is not available to contribute to the froth height on the tray surface. All of these factors lead to reduced efficiency, higher pressure drop, higher entrainment and reduced flooding limits of operability for the tray.

Accordingly, it is an object of the present invention to provide an improved vapor-liquid contacting tray. It is another object of the invention to provide improved liquid discharge means for a vapor-liquid contacting tray having spout openings in the floor members of the downcomers.

Other objects and advantages of the invention will be apparent from the ensuing disclosure and the appended claims.

SUMMARY OF THE INVENTION

This invention relates to liquid discharge means for a vapor-liquid contacting tray having spout openings in the floor members of the downcomers.

Briefly the invention relates to a vapor-liquid contacting tray of a type adapted for mounting in a vapor-liquid contacting column having plurality of such trays vertically spaced apart from one another. The contacting tray includes perforated fluid contact means providing an active major portion of the tray surface area to support a two-phase fluid dispersion of vapor in liquid for mass exchange and downcomer means extending through the perforated fluid contact means as the sole liquid transfer means and comprising the minor portion of the tray surface area. Each downcomer means comprises inlet edge means each adjacent to a section of the active area portion, and imperforate relatively deep side walls which define a discrete inactive portion of the tray surface area, provide an inlet end section for receiving a fraction of the two-phase fluid dispersion and permitting vapor to disengage therefrom, and provide an outlet end section for collecting disengaged liquid and discharging such disengaged liquid from the tray. Each downcomer means also comprises a floor member attached to the outlet end section having a multiplicity of spaced-apart spout openings therein, so constructed that a sealing effect against vapor penetration may be provided by a stable head loss of liquid passing therethrough such that a pool of disengaged liquid may be maintained in the downcomer means.

The improvement of the invention comprises lip means associated with the spout openings including a first wall segment disposed adjacent a spout opening and extending therefrom to an edge at an angle measured with respect to a plane defined by the spout openings of from 30° to 180° and with a length of between 0.1 and 0.9 times the width of the spout openings associated with the lip means and a second wall segment contiguous with and extending from the edge of the first wall segment transversely beneath the spout openings associated with the lip means at an angle measured with respect to the plane defined by the spout openings of from 0° to 35°, with the second wall segment being laterally coextensive with the associated spout openings, whereby liquid in the downcomer flowing through the spout openings is vertically damped and given a horizontal velocity component by the lip means for dispersed flow of discharged liquid onto the active portion of tray surface area of an underlying tray.

In a preferred embodiment of the present invention, the above-described lip means are employed in a multiple downcomer vapor-liquid contacting tray of the type disclosed in U.S. Pat. No. 3,410,540 to W. Bruckert.

BRIEF DESCRIPTION OF THE DRAWINGS

FIG. 4 is an enlarged sectional elevational view of a downcomer outlet end section with liquid discharge means according to one embodiment of the present invention.

FIG. 5 is a cross-sectional elevational view of the outlet end section of another downcomer means employing liquid discharge means according to another embodiment of the present invention.

FIG. 6 is a plan view of two superimposed trays constructed in accordance with the present invention illustrating an exemplary relative arrangement of such trays in a vapor-liquid contacting column.

FIG. 7 is a schematic drawing of apparatus employed to evaluate penetrative weeping using downcomer means constructed in accordance with the present invention.

DETAILED DESCRIPTION OF THE PREFERRED EMBODIMENTS

In the following description of multiple downcomer vapor-liquid contacting trays, wherein the tray comprises narrow, trough-like downcomer means evenly spaced across the tray in parallel relation to each other with longitudinally extending sidewalls and transversely extending end walls, the length of the downcomer means refers to the horizontal dimension normal to the direction of liquid flow approaching the downcomer from the main tray surface. The width of each downcomer means refers to the dimension of the downcomer means inlet parallel to the direction of the approaching liquid.

Figure 1:
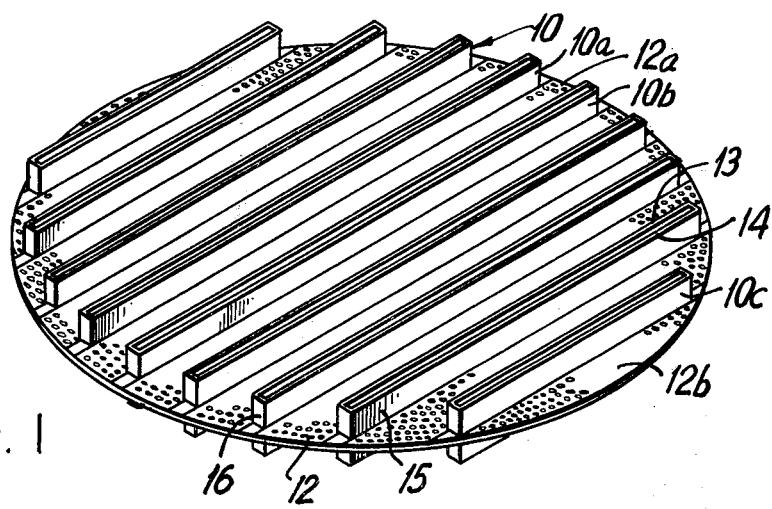
FIG. 1 is a perspective view of a vapor-liquid contacting tray such as may be usefully employed in the practice of the present invention.

Referring now to the drawings, FIG. 1 shows a vapor-liquid contacting tray of the general type disclosed and claimed in Bruckert, U.S. Pat. No. 3,410,540, incorporated herein to the extent pertinent. The tray features multiple, narrow, trough-like downcomer means 10 which are evenly spaced across a distillation tray surface and extend through the perforated fluid contact means 12 such that the perforated fluid contact means 12 is divided into sections of substantially equal surface area per unit length of adjacent downcomer means. Thus, by way of example, the ratio of the surface area of the section 12a of the perforated fluid contact means 12 of FIG. 1 to the combined length of the adjacent downcomer means 10a and 10b is substantially equal to the ratio of the surface area of the section 12b to the length of the adjacent downcomer means 10c. To provide the necessary equality of surface areas per unit length of adjacent downcomer means, at least three and preferably more such downcomer means are provided, equispaced across the tray surface as shown in FIG. 1. The perforated fluid contact means 12 provides the active major portion of the tray surface area to support a two-phase dispersion of vapor in liquid for mass exchange. Each downcomer means comprises two spaced longitudinal inlet edges 13, 14 each adjacent to a section of the active portion of the tray surface and extending across the tray. These longitudinal inlet edges are associated with imperforate relatively long and deep longitudinal side walls 15 and imperforate relatively short transverse end walls 16 which define a discrete inactive portion of the tray surface area, provide an upper inlet end section for receiving a fraction of the two-phase fluid dispersion and permitting vapor to disengage therefrom, and provide a lower outlet end section for collecting disengaged liquid and discharging such disengaged liquid from the tray. Each downcomer means further comprises a horizontally extending floor member attached to the outlet end section of the downcomer having a multiplicity of spaced-apart spout openings therein so constructed that a sealing effect against vapor penetration may be provided by a stable head loss of liquid passing therethrough such that a pool of disengaged liquid may be maintained in the downcomer means. The tray thus comprises defined areas for vapor flow upward through the perforated fluid contact means 12 and precisely defined areas for liquid flow downward through the multiple downcomer means 10.

By disengaged liquid is meant liquid which is freed of a substantial portion of the vapor in the original froth, so that the apparent density of the disengaged liquid is substantially higher than the froth on the active tray surface. The apparent density of two-phase fluids may be expressed as the volume fraction of liquid it contains. Thus the apparent density of active froth, referred to that of clear liquid, may be only 30% whereas the apparent density of disengaged liquid in the downcomer should preferably be above 60%. In a properly functioning downcomer, the disengaged liquid acts as a homogeneous fluid and any residual vapor content not released in the disengagement section is swept downward with liquid through the downcomer end section. As shown in FIG. 1, the multiple downcomers 10 are positioned parallel to one another across the tray surface. Each downcomer extends substantially from one end of the tray to an opposite edge along the respective chord of the tray defined by the downcomer. These multiple narrow, trough-like downcomers employed in connection with the present invention have been discovered to be capable of handling far more fluid for the area they occupy than prior art downcomers.

High vapor capacity becomes practical with the trays employed in the present invention as a result of their ability to control the froth height at a low, uniform level. Low uniform froth height is obtained by means of the long overflow inlet associated with the plurality of downcomer means spaced and distributed across the tray area. The amount of tray area serviced by each unit length of downcomer inlet is small, and consequently the crest of froth flowing over the inlet is very low. Since the total crest height is low, the variation in crest height attendant changes in liquid and vapor flow rates is greatly reduced as compared with the inlets of prior art downcomers. The side walls 15 of the downcomer means employed in connection with the present invention will usually be extended vertically upwardly beyond the froth carrying surface of the tray to provide raised inlet weirs of uniform height as shown in FIG. 1.

The crest height is superimposed upon a substantial depth of froth fixed by the weir height and any variation in crest height will be a small fraction of the total froth height. The froth height and the concomitant pressure drop are virtually unaffected by variations in liquid loading and therefore far higher loadings are obtainable than possible with conventional cross-flow trays.

As a general rule, adequate froth height control will be achieved with multiple downcomer trays of the type shown in FIG. 1 and employed in connection with the present invention by providing between about 1.0 and 5.0 feet of downcomer inlet length per square foot of total tray area. If loading is so low that less than about 1.0 foot of downcomer inlet length can serve a square foot of tray area efficiently, crest control, gradients, and downcomer capacity are not highly critical and can be handled reasonably well on conventional cross-flow trays, perhaps assisted by vapor propulsion. On the other hand, if more than about 5.0 feet of downcomer inlet length is provided per square foot of tray area, then it is apparent that even though downcomers which make optimum use of their area are used, they still occupy a large fraction of the total tray surface; for example, 5.0 feet of downcomer inlet length per square foot of tray area provided by two-inch wide downcomers results in about 40% utilization of the tray area for downcomers. More than 5.0 feet of downcomer inlet length per square foot of tray area requires very close spacing of the downcomers and leaves such a narrow width of perforated area between the downcomers that it becomes difficult to receive the liquid falling onto the surface of the tray from the tray above without spilling a portion directly into the downcomers. Thus, downcomer area representing 40% tray utilization is about the preferred maximum percentage to be employed in trays constructed in the manner shown in FIG. 1. The lower limits on the downcomer inlet length and downcomer width also result in 7% preferred minimum percentage of the tray area occupied by the multiple downcomers.

In order to provide the requisite downcomer liquid capacity to handle the greatly increased flow rates capable of achievement with trays of the type shown in FIG. 1 and employed in connection with the present invention, the width of the downcomer inlet should be between about 0.07-0.4 of the center-to-center spacing of the downcomers across the tray.

Figure 2:
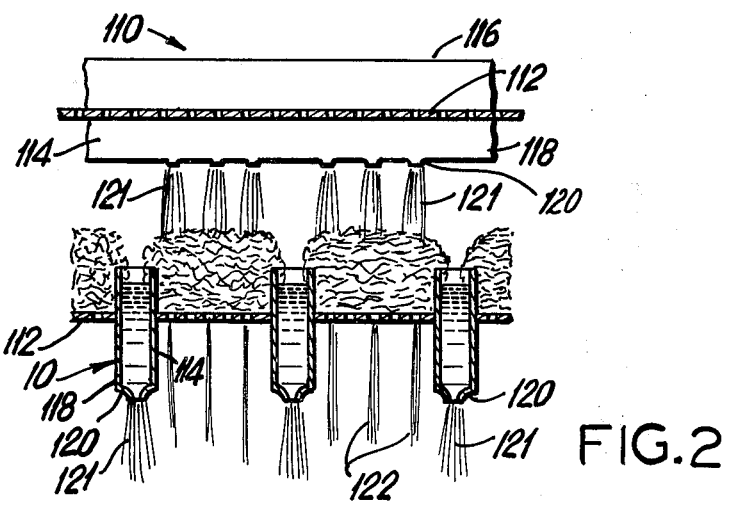
FIG. 2 is a sectional view in elevation of a portion of a vapor-liquid contacting column employing trays of the general type shown in FIG. 1, showing the penetrative weeping effects which are overcome by the means of the present invention.

In FIG. 2, there is shown a sectional elevational view of portions of two adjacent vapor-liquid contacting trays constructed in accordance with the teachings of the aforementioned Bruckert patent, U.S. Pat. No. 3,410,540. As shown, the adjacent trays in the contacting column are oriented such that their respective downcomer means are horizontally aligned at 90° relative to one another. In this manner, the liquid which is discharged by the downcomer means of the overlying tray falls on to the sections of the horizontally disposed tray part between adjacent downcomers on the underlying tray. FIG. 2 clearly illustrates the weeping liquid penetration phenomenon which tends to occur in trays constructed in accordance with the prior art teachings. As shown, the perforated horizontal part 112 provides the active major portion of the tray surface area to support a two-phase fluid mixture of vapor in liquid for mass exchange. Each downcomer comprises imperforate side walls 114 which define a discrete inactive portion of the tray and provides an inlet end section 116 for receiving a fraction of the two phase mixture from the adjacent section of the perforated section of the horizontal part 112 and permitting vapor to disengage therefrom. The imperforate side walls 114 also provide an outlet end section 118 for collecting liquid disengaged from such two phase mixture and discharging the disengaged liquid 121 from the tray. Each downcomer further comprises a floor member 120 having spaced-apart spout openings therein which control discharge of the disengaged liquid. Visual observation of internal operation of a vapor-liquid contacting column employing trays as shown in FIG. 2 has shown that the momentum of the falling disengaged liquid 121 when added to the hydrostatic head of froth on the tray surface of the underlying tray is sufficient to overcome the dry plate pressure drop of the rising gas so that a substantial quantity of liquid passes in streams 122 directly through the perforated horizontal part 112 prior to any significant gas-liquid contact. Such liquid weeping involves bypassing of the liquid on the underlying tray and contributes to lowered tray efficiency. This is because, as shown in FIG. 2, the liquid in the discharged streams 121 from the outlet means of the downcomer of the overlying tray passes directly through the froth on the underlying tray and issues in the streams 122 from the latter tray, so that such liquid is not involved in the intimate gas-liquid contacting operation which occurring on the perforated horizontal part sections of the underlying tray. Such weeping behavior is effectively overcome by the liquid discharge means of the present invention.

Figure 3:
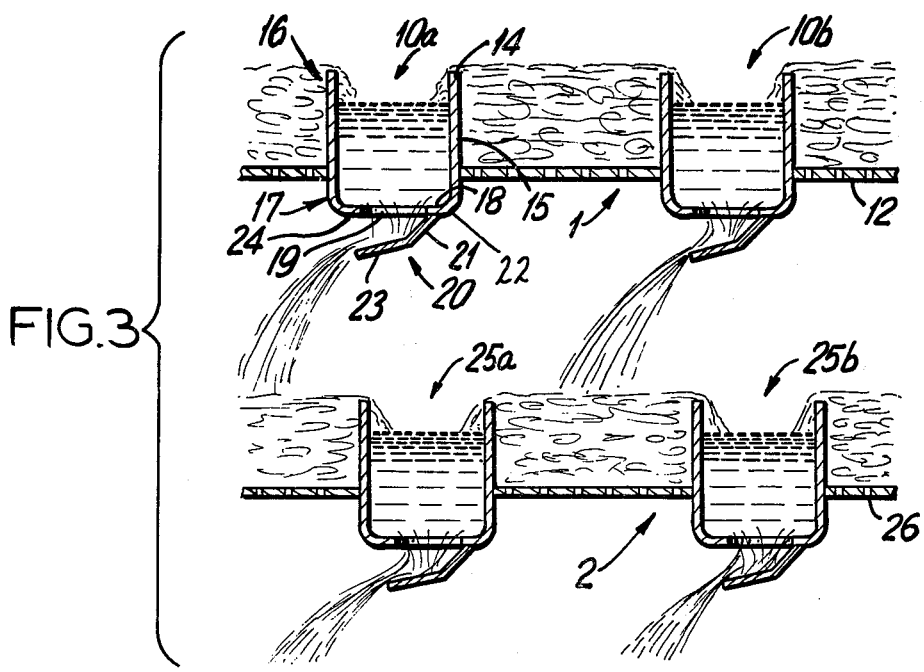
FIG. 3 is a sectional view in elevation of a portion of a vapor-liquid contacting column showing the downcomer means of two adjacent vapor-liquid trays which employ the liquid discharge means of the present invention.

In FIG. 3, there is shown a sectional elevational view of portions of two adjacent vapor-liquid contacting trays constructed in accordance with the present invention, shown as mounted in a vapor-liquid contacting column. The upper contacting tray 1 includes perforated fluid contact means 12 and two narrow, trough-like downcomer means 10a, 10b spaced across the tray in parallel relation to each other and extending through the perforated fluid contact means 12. Each of the downcomer means comprises spaced longitudinal inlet edges 14 each adjacent to a section of the active portion 12 and extending across the tray. The imperforate relatively long and deep longitudinal side walls 15 and imperforate relatively short transverse end walls (not shown) provide an inlet end section 16 for receiving a fraction of the two-phase fluid dispersion and permitting vapor to disengage therefrom and provide an outlet end section 17 for collecting disengaged liquid and discharging such disengaged liquid from the tray. Associated with the outlet end section of the downcomer means is a floor member 18, attached to the outlet end section, having a multiplicity of spaced-apart spout openings 19 therein.

Lip means 20 are associated with the spout openings 19 including a first wall segment 21 disposed adjacent spout opening 19 and extending therefrom to an edge at an angle measured with respect to the plane defined by the spout openings of from 30° to 180° and with a length of between 0.1 and 0.9 times the width of the spout openings associated with the lip means 20. The lip means 20 also comprises a second wall segment 23 contiguous with and extending from the edge of the first wall segment transversely beneath the spout opening 19 associated with the lip means at an angle measured with respect to the plane defined by the spout opening of from 0° to 35°, with the second wall segment being laterally coextensive with the associated spout opening 19. As used herein, the term "laterally coextensive" means that the second wall segment is coextensive with the associated spout opening or openings in a direction perpendicular to the transverse direction along which the second wall segment extends beneath the spout openings associated with the lip means at an angle measured with respect to the plane defined by the spout openings of from 0° to 35°. The lip means serve to vertically damp liquid in the downcomer flowing through the spout opening and give a horizontal velocity component to the liquid for dispersed flow of discharged liquid on to the active portion 26 of tray surface area of the underlying tray 2. Tray 2, comprising downcomer means 25a and 25b, is identical in structure to tray 1, with the exception that the downcomer means of tray 2 are transversely displaced with respect to the position of downcomer means 10a and 10b of tray 1, so that the discharged liquid from the downcomers of tray 1 is directed on to the active area portions of tray 2 and is not discharged directly into the downcomers of the underlying tray.

The downcomer outlet means of trays used in accordance with the present invention employ a dynamic seal in the form of relatively few openings in the floor member of the downcomer means which are usually considerably larger than the perforations in the perforated fluid contact means. These openings constitute orifices or spout openings through which liquid is discharged from the downcomer means. These openings may suitably be circular or rectangular or any other configuration if desired. The large downcomer spout openings possess a sealing effect which depends upon a small dynamic head loss which the liquid experiences in passing through the spout opening. It has been established that this head loss must correspond to at least 0.15 inches of disengaged liquid in the downcomer means and preferably between 0.15 and 0.5 inches to insure stability. In addition, the reliability of the seal is dependent upon a relatively wide spacing or "scatter" of spout openings along the floor member of the downcomer. The spout openings are suitably designed using common orifice equations, such as are well known to those of ordinary skill in the art.

In order to obtain a dependable dynamic seal, one must take into account the transient forces which may permanently disrupt the operation of a downcomer spout opening. When the froth on the perforated portion of the tray surface crests into the downcomer means, wave-like motions are generated in the liquid within the downcomer means on impact of the liquid disengaged from the cresting froth. These motions cause localized momentary flucuations in the liquid height within the downcomer means. When a wave of sufficient ammplitude occurs over a downcomer spout opening, the lateral flow of adjacent liquid into the zone may not be rapid enough to maintain the effective head at a value required to counteract the vapor pressure difference across the tray. Consequently, the vapor will pass momentarily through the spout opening into the downcomer means. Furthermore, at any given location, the pressure drop across the tray is not perfectly steady, but fluctuates slightly due to the turbulence of the froth. If an increase in pressure drop of sufficient magnitude occurs abruptly it may also cause vapor to penetrate the downcomer liquid momentarily.

An important aspect of the downcomer spout openings employed in connection with the present invention is that liquid within the downcomer surrounding such a spout opening will immediately restore liquid flow through the spout opening after occurrence of a transient. In order to provide positive resealing capability, the spout openings must be so arranged and distributed along the downcomer as to insure that the liquid head adjacent a spout opening or small group of spout openings is not adversely reduced by transient vapor penetration. Such undisturbed adjacent liquid will exert lateral as well as downward pressure, and the lateral influence of this liquid is relied upon to reseal the adjacent spout opening.

In general, well spaced openings or spouts can accommodate a transient vapor penetration without permanent disruption since the hydrostatic effect of the transient is localized and "insulated" by dense, undisturbed liquid. In contrast, crowded openings result in transient interference between adjacent openings, due to the migration of bubbles over the adjacent openings. When this occurs, the effect of the transient spreads rapidly and destroys the hydrostatic seal along the entire length of the downcomer. The downcomer will not again pass liquid unless the downcomer zones become flooded with froth to an extreme intolerable degree.

The large spout openings can be readily spaced well apart because only a few of them are required. Vapor penetration through one such spout will not influence the seal of adjacent spout openings. Furthermore, it has been observed that as spout openings become larger, bubbles produced by vapor penetration become smaller, so that the risk of transient interference between spouts is further reduced.

On the other hand, small openings must be provided in large numbers, crowded together, in order to obtain the necessary downcomer discharge capacity. Bubble migration spreads the effect of a transient across the crowded spout openings. Transient vapor penetration produces bubbles equal to or larger than the diameter of the opening, thus further promoting interference between openings.

Preferred sizes of the spout openings in the broad practice of the present invention are between $\frac{3}{8}$ inch and $1\frac{1}{2}$ inches. The size and number of spouts provided per unit length of downcomer should be chosen to provide an orifice head loss of at least 0.15 inch of liquid, as stated hereinabove.

It is not required or necessarily desirable to space the spout openings along the downcomer. It has been established that several such spouts (e.g., four or five) may be grouped together along the length of the downcomer outlet means, and provided that there is adequate spacing from adjacent groups, such grouping will not result in a disruptive bubble migration or interaction. 4 or 5 is near the limit for the number of spout openings in any one group and spacing between such groups should be at least 2 to 3 spout diameters, but not less than 1 inch. In the broad practice of the present invention, the lip means associated with the spout openings may suitably comprise a lip means associated with a single spout opening, or, where for example the spout openings are arranged in groups, each lip means may be associated with a single group of individual spout openings, as shown more fully hereinafter.

FIG. 4 shows an enlarged partial elevational view of downcomer means constructed in accordance with the present invention and as shown in FIG. 3. The same reference numerals are used in the FIG. 4 drawing as are employed in FIG. 3 and in the preceding description thereof. As shown in FIG. 4, the outlet end of the downcomer means comprises the lower portion of longitudinal side walls 15a and 15b, which are joined to the horizontally extending floor member 18. The lip means 20 depends downwardly from the floor member 18 and extends transversely beneath the spout opening 19. The lip means 20 comprises the first wall segment 21 and the second wall segment 23.

In the broad practice of the present invention, the first wall segment is disposed adjacent a spout opening and extends therefrom to an edge at an angle $\theta_1$ measured with respect to the plane F—F defined by the spout openings of from 30° to 180° and as for example 45°. The purpose of the first wall segment 21 is to provide an attachment means that allows unrestricted flow of the disengaged liquid through the spout opening and, in conjunction with the second wall segment to vertically damp the flowing liquid and impart a horizontal velocity component to this liquid. For these reasons, the angle $\theta_1$ of the first wall segment 21 should not be less than 30° or more than 180°. At angles below 30°, the spout openings tend to become excessively restricted, thereby increasing downcomer spout head loss and increasing the likelihood of downcomer flooding. The upper limit of 180° is based upon considerations of ease of fabrication, as providing minimum restriction of the downcomer spout opening for a given amount of material of fabrication for the first wall segment.

In the broad practice of the present invention, the first wall segment 21 should have a length L of between 0.1 and 0.9 times the width $W_S$ of the spout opening or openings associated with the lip means. If the length of the first wall segment is less than 0.1 times the width of the spout opening or openings associated with the lip means, undue restriction of the spout opening or openings results. On the other hand, a length of the first wall segment of the lip means above 0.9 times the width of the associated spout opening or openings would in some cases result in excessive velocities being imparted to the liquid, which in turn would cause the liquid discharge from the lip means to be dispersed in the vapor space between the trays as a finely divided spay, with correspondingly high levels of liquid entrainment in the upwardly flowing vapor phase. Such high velocities may cause the discharged liquid to fall directly into a downcomer on the next lower tray, thus bypassing a stage of vapor-liquid contact. In other cases, a length of the first wall segment of the lip means above 0.9 times the width of the spout opening or openings associated with the lip means will produce an unnecessarily complicated design for achieving the objects of this invention.

The second wall segment of the lip means is contiguous with and extends from the edge of the first wall segment transversely beneath the spout opening or openings associated with the lip means at an angle measured with respect to the plane defined by the spout openings of from 0° to 35°, with the second wall segment being laterally coextensive with the associated spout opening or openings. The function of the second wall segment of the lip means is to channel the liquid issuing from the spout opening in a generally horizontal direction for dispersed flow of discharged liquid onto the active portion of tray surface area of an underlying tray. Thus, the second wall segment 23 is minimally parallel (i.e., $\theta_2 = 0°$) to the plane F—F defined by the spout openings 19 of the downcomer means. The angle $\theta_2$ should not exceed 35°, for the reason that at angles above such value the channeled liquid would tend to be discharged from the lip means in a non-dispersed flow pattern and in some cases with minimal vertical damping would result in the impingement of large volumes of discharged liquid onto localized areas of the active portion of tray surface area of the underlying tray and liquid weeping through such active surface area of the underlying tray.

As based on the aforementioned considerations, preferred ranges for the parameters of the lip means of the invention are as follows: $\theta_1$: 30° to 55°; L: 0.1 to 0.5 times the width of the spout opening or openings associated with the lip means; and $\theta_2$: 0° to 20°. In preferred practice of the invention, the angle $\theta_2$ of the second wall segment is a function of the angle $\theta_1$ of the first wall segment and suitably lies in a range as defined by the following equations:

$$(0.05\theta_1 - 1.5) \leq \theta_2 \leq (0.03\theta_1 + 30)$$

where $30° \leq \theta_1 \leq 180°$.

In the FIG. 4 embodiment, the lip means associated with the spout opening 19 includes first wall segment 21 contiguous with and extending from a first portion 22 of the downcomer floor member 18 adjacent spout opening 19 to an edge at an angle $\theta_1$ measured with respect to plane F—F defined by the spout opening 19 of approximately 50° and with a length which is about 0.4 times the width $W_S$ of the associated spout opening 19. The second wall segment 23 is contiguous with and extends from the edge of the first wall segment transversely beneath the spout opening 19 associated with the lip means 20 to a terminal edge disposed verticaly beneath a second portion 24 of the downcomer floor member 18 located transversely across the spout opening 19 from the first portion 22 of the downcomer floor member 18 at an angle measured with respect to the plane F—F defined by spout opening 19 of approximately 10°.

FIG. 5 shows a sectional, elevational view of the outlet end section of a downcomer according to another embodiment of the present invention. The lower ends of the imperforate longitudinal side walls 27a and 27b are joined to a floor member 28 attached to the outlet end of the downcomer. The horizontally extending floor member 28 is provided with spout opening 29 therein. In this embodiment, the first wall segment 31 of the lip means 30 is contiguous with and extends transversely downwardly from a first portion 32 of the downcomer floor member 28 adjacent spout opening 29 to a lower edge at an angle measured with respect to the plane defined by the spout opening 29 of from 0° to 180° and with a length of between 0.1 and 0.9 times the width of spout opening 29. The lip means 30 also comprises a second wall segment 34 coextensive with and extending transversely from the lower edge of the first wall segment 31 to a terminal edge disposed vertically beneath a second portion 35 of the downcomer floor member 28 located transversly across the spout opening from the first portion 32 of the downcomer floor member 28 at an angle measured with respect to the plane defined by the spout opening 29 of from 0° to 35°.

In this embodiment, the first and second wall segments of the lip means are perforated, the first wall segment having a perforation 33 disposed therein and the second wall segment having perforations 36 therein. The purpose of such perforations is to permit some liquid issuing from the spout opening 29 to fall directly beneath the downcomer, and thus prevent a stagnant area from forming on the active portion of tray surface area of the underlying tray. In general, the use of such peforations will depend on the configuration of the underlying tray, as for example the placement of the downcomer means thereon relative to the downcomer means on the overlying tray and on the width of the active portion of tray surface area of the underlying tray being serviced by the downcomer. In the embodiments of the invention where perforation of the wall segments of the lip means is desired, it is preferable that the lip means are perforated with an open area which is less than 0.5 times the open area of the spout opening. The reason for such limit is that at perforated open areas about 0.5 times the open area of the spout opening, an excessive amount of liquid would directly impinge on the active portion of tray surface area of the underlying tray beneath the downcomer, with consequent tendency toward liquid weeping through the active portion of tray surface area being served by the downcomer.

The FIG. 5 embodiment, aside from the provision of perforations in the wall segments of the lip means, differs from the embodiment of the invention shown in FIG. 4 in that in the former embodiment the first wall segment of the lip means has an upper edge which is integral with the first portion of the downcomer floor member adjacent the spout opening. In practice, the first wall segment of the lip means may be integral with the first portion of the downcomer floor member or, alternatively, may be provided as a separate structural member attached to the downcomer floor member, as is desired for ease of fabrication in a given application.

FIG. 6 shows a plan view of two superimposed trays constructed in accordance with the present invention illustrating an exemplary relative arrangement of such trays in a vapor-liquid contacting column. In this regard, it is to be noted that tray arrangement in the vapor-liquid contacting column may also influence spout opening distribution along the downcomer means. In one preferred usage, trays constructed in accordance with the present invention are installed so that downcomers on adjacent (or sequential) trays are aligned at 90° as shown in the drawing. The spout openings should be located so that a stream of liquid is not directed by the lip means directly into an underlying downcomer. The requirement tends to group the spout openings within the downcomer over the active area of the tray below. Referring to the drawing, downcomers shown in broken line are on the underlying tray. For best operation of a column employing trays constructed in accordance with the present invention, successive trays should be oriented to permit some redistribution of liquid as it progresses from tray to tray through the column, inasmuch as there is essentially no interchange of liquid between tray sections subtended by downcomers on a given tray.

The advantages of the present invention will be shown more fully by the example set forth below.

EXAMPLE

FIG. 6 is a schematic diagram of apparatus employed to test downcomer means constructed in accordance with the present invention. The test apparatus was used to evaluate performance behavior of the downcomer means in vapor-liquid contacting between air and water. The apparatus included a structural housing 100 whose lower portion is divided by wall member 101 into two discrete portions. One portion, on the left-hand side of wall 101 as shown, included a water reservoir disposed beneath tray test section 120. The tray test section 120 contained an upper tray 109 having a single downcomer 110 with a floor member 111 having spout openings disposed therein and a lower tray 112 having a downcomer 113 disposed so as to discharge liquid downwardly into the reservoir on the left-hand side of the partition wall 101. Water was pumped from the reservoir on the left-hand side of the partition wall 101. Water was pumped from the reservoir chamber in line 103 by pump 102, flowed in line 104 through flow regulator 105, rotameter 106 and line 107 into a distribution trough 108 overlying the tray 109. The distribution trough was so constructed that water overflowed therefrom onto a blanked-off area of the top tray at the opposite end of tray 109 from the downcomer 110.

Air was flowed to the tray test section 120 by fan 117 in line 118, the latter being arranged to discharge beneath the lower tray 112 for upward flow therethrough. In this manner air was flowed through the tray test section upwardly into the air duct 114 containing air flow regulator 115 and returned to the fan 117 through the air flow orifice 116.

The trays 109, 112 in tray test section 120 were rectangular in shape each with a width of 402 mm. and a length of 500 mm. The downcomers on the respective trays had a width of 70 mm. and a length of 500 mm. The downcomer 110 of upper tray 109 had a horizontally extending downcomer floor member 111 which contained 11 spout openings, each rectangular in shape with a length of 57 mm. and a width of 15 mm. arranged in groups of 4, 3 and 1 spouts. The spacing between spouts in a group was 15 mm. and the total spout area was 0.1012 feet$^2$. The downcomer 113 of the lower tray 112 contained only 3 spout openings, each having a width of 15 mm. and a length of 57 mm. By blanking off the tray deck, a hydrostatic head manometer attached to this downcomer was calibrated using the water rotameter 106. This enabled the water flow rate through the bottom downcomer 113 to be measured during the ensuing tests. The difference between rotameter flow rate and the bottom downcomer flow rate was calculated to give the rate of liquid penetration through the bottom tray 112. The perforated plates used in the test trays 109, 112 were each 2 mm. thick, with 5 mm. perforations and a fractional perforation open area of 0.1242. Each of the downcomers had a weir height of 60 mm. and the trays were spaced apart a distance of 320 mm. The distance between the bottom of the top downcomer 110 and the bottom tray was 190 mm. Various manometer and hydrostatic head tubes (not shown) were installed in the test assembly to allow measurement of top tray pressure drop, spout head loss in the bottom downcomer 113 (calibrated to give water flow rate) and hydrostatic head in the top downcomer 110.

Three separate tests were carried out using the test assembly shown. In the first test, the floor member 111 of downcomer 110 was unmodified and did not employ lip means according to the present invention. In the second test, lip means generally similar to those shown in FIG. 4 herein were attached to the floor member of the downcomer 110. In the third test, lip means generally similar to that shown in FIG. 5 herein were attached to the floor member 111 of the downcomer 110. In the second test, the water distribution trough was modified to feed directly into the top downcomer, thereby reducing the pressure drop over the top tray 109. In all other tests, the water distribution trough was oriented to feed onto the extremity of the top tray 109 farthest from downcomer 110.

The results of the three tests are set forth in the Table below:

TABLE

Penetrative Weeping of Conventional Downcomer and Downcomers Constructed According to the Present Invention

| Test No. | Liquid Flow Rate, m$^3$/hr. | Vapor Flow Rate ft$^3$/sec | Penetration, % | Pressure Drop Across Tray, mm Liquid |
|---|---|---|---|---|
| 1 | 10 | 8.6 | 23.5 | 24 |
| 2 | 10 | 8.6 | 4.2 | 26 |
| 3 | 10 | 8.6 | 2.0 | 25 |

These results show that the prior art downcomer, without lip means of the present invention, exhibited a high degree of penetrative weeping (23.5%). Such high degree of penetration of liquid is associated with severe by-passing behavior on the underlying tray, with consequent adverse effect on overall mass transfer performance of the vapor-liquid contacting system. In the second test, the lip means was constructed in a manner similar to that shown in FIG. 4 herein, with a first wall segment angle $\theta_1$ of 45°, a length L of 17.1 mm., and a second wall segment angle $\theta_2$ of 10°. In the third test, the lip means were constructed in a manner generally similar to that shown in FIG. 5 herein, with a first wall segment angle $\theta_1$ of 45°, a first wall segment length L of 17.1 mm., a second wall segment angle $\theta_2$ of 10°, and 5 mm. diameter perforations, the perforations being 20% of the spout opening cross sectional area. As shown by the tabulated results, the FIG. 4 embodiment of the present invention exhibited only a 4.1% penetration level and the FIG. 5 embodiment of the invention exhibited only a 2.0% penetration level. These results indicate substantial reduction of the degree of penetrative weeping through the underlying tray 112 in the test apparatus and a significant improvement over the prior art downcomer design of test number 1.

Although the preceding description has been drawn to the use of the liquid discharge means of this invention in connection with trays of the type disclosed and claimed in Bruckert, U.S. Pat. No. 3,410,540, it will be recognized that the utility of the present invention is not limited to such type of trays. Rather, the liquid discharge means of the present invention may usefully be employed on any vapor-liquid contacting trays which are vertically spaced apart in a vapor-liquid contacting column such that the downcomer outlet end sections of such tray terminate in the vapor disengagement space of the underlying tray and the downcomers thereof discharge liquid onto the active porton of tray surface area of the underlying tray.

Figure 8:
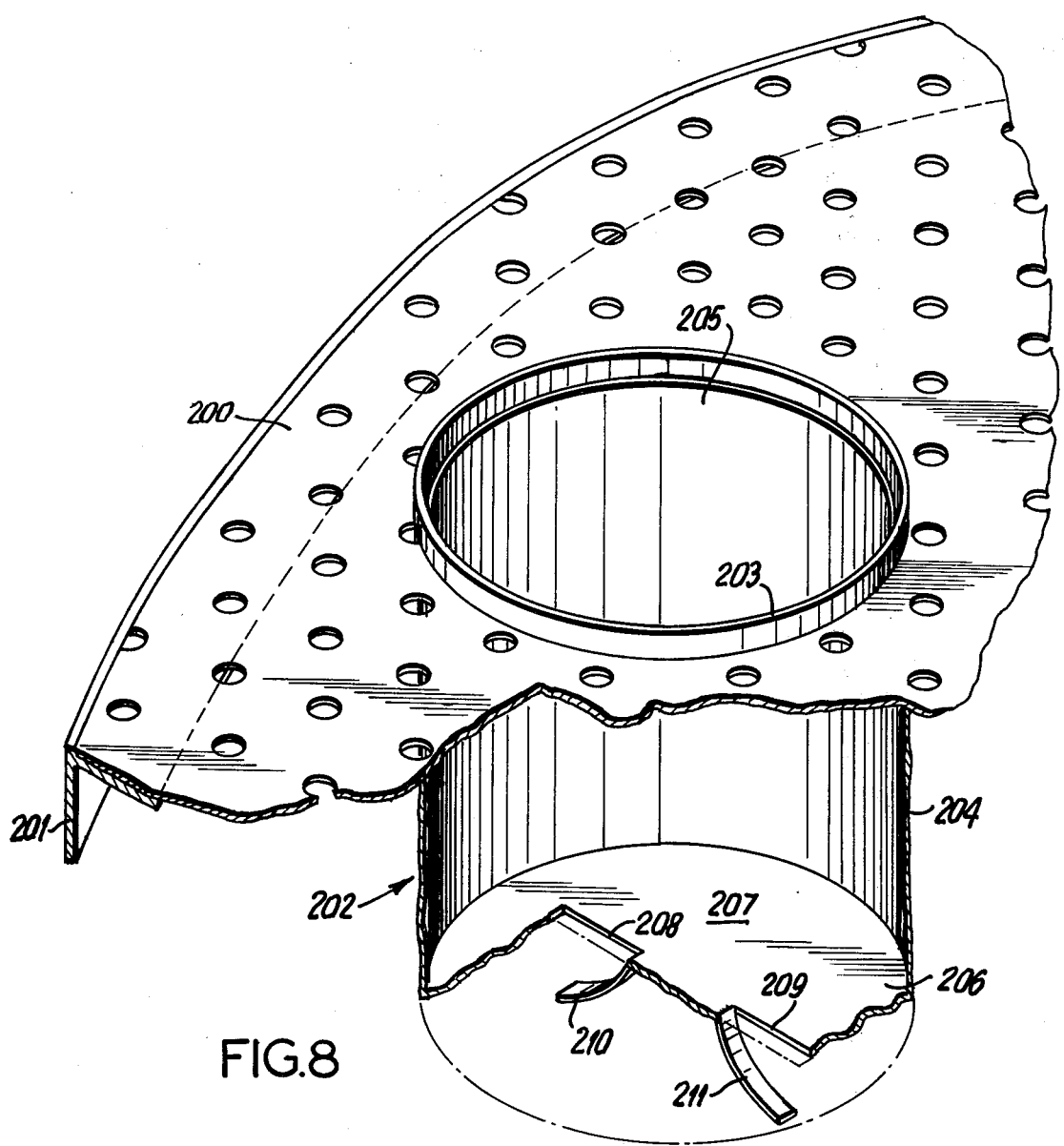
FIG. 8 is a perspective view of a portion of another type of vapor-liquid contacting tray employing liquid discharge means according to another embodiment of the invention.

FIG. 8 is a perspective view of a portion of another type of vapor-liquid contacting tray employing liquid discharge means according to another embodiment of the invention. The contacting trays includes perforated fluid contact means 200 which provide an active major portion of the tray surface area to support a two-phase fluid dispersion of vapor in liquid for mass exchange. The tray is supported in the contacting column at its periphery by circumferentially extending support bracket 201. The tray is provided with downcomer means 202 extending through the perforated fluid contact means 200 as the sole liquid transfer means comprising the minor portion of the tray surface area.

The downcomer 202 comprises inlet edge means 203 adjacent to a section of the active portion and imperforate relatively deep side walls 204 which define a discrete inactive portion of the tray surface area, provide an inlet end section 205 for receiving a fraction of the two-phase fluid dispersion and permitting vapor to disengage therefrom, and provide an outlet end section 206 for collection of disengaged liquid and discharging such disengaged liquid from the tray. Downcomer 202 also comprises floor member 207 having spaced-apart spout openings 208 and 209 therein so constructed that a sealing effect against vapor penetration may be provided by a stable head loss of liquid passing therethrough such that a pool of disengaged liquid may be maintained in the downcomer means. Lip means 210 and 211 are provided depending downwardly from the floor member 207, respectively coextensive with and extending transversely beneath spout openings 208 and 209.

Figure 9:
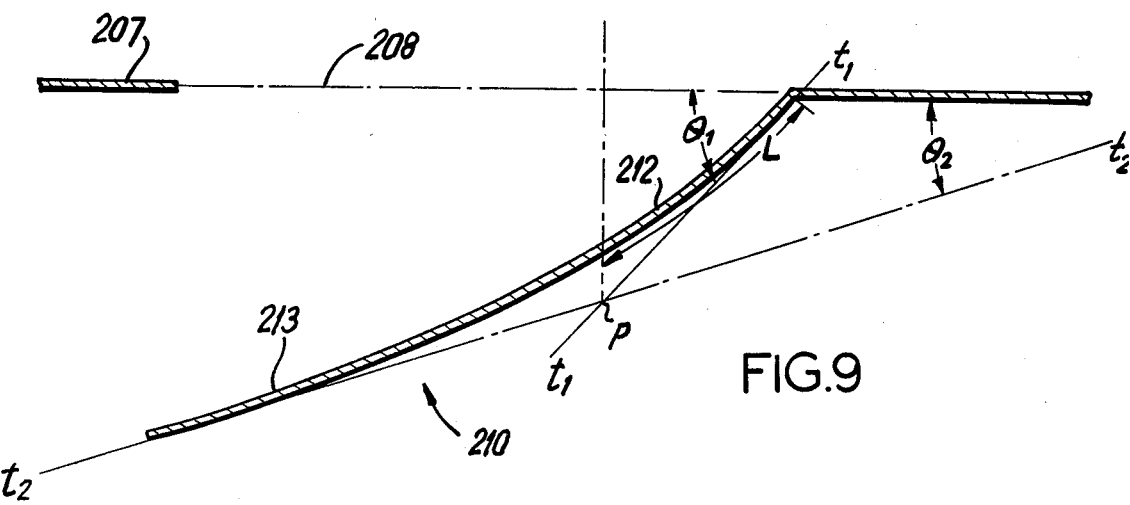
FIG. 9 is a sectional, elevational view of a lip means of the FIG. 8 downcomer.

FIG. 9 is a sectional elevational view of the lip means 210 of the FIG. 8 downcomer. This lip means, in contrast to the embodiments previously described, is composed of curvilinear first and second wall segments 212 and 213 respectively. In this curvilinear embodiment, the lower edge of the first wall segment 212 is defined by the intersection with the lip means of a line perpendicular to the plane defined by the downcomer spout opening 208 and extending from such plane to a point P of intersection between a tangent $T_1$-$T_1$ to the upper edge of the first wall segment 212 and a tangent $T_2$-$T_2$ to the lower edge of the second wall segment 213. The angle of the first wall segment 212 measured with respect to the plane defined by the spout opening 208 is the angle $\theta_1$ between tangent $T_1$-$T_1$ and the plane of the spout opening 208. The length L of the first wall segment is between 0.1 and 0.9 times the width of the spout opening 208, and angle $\theta_1$, is from 30° to 180°, for the same reason set forth hereinabove in connection with the FIGS. 4 and 5 embodiments herein. The angle of the second wall segment 213 measured with respect to the plane defined by the spout opening 208 is the angle $\theta_2$ between tangent $T_2$-$T_2$ and the plane of the spout opening 208; this angle should be 0° and 35°, for the same reasons as discussed herein earlier in connection with embodiments having linear first and second wall segements of the lip means.

Figure 10:
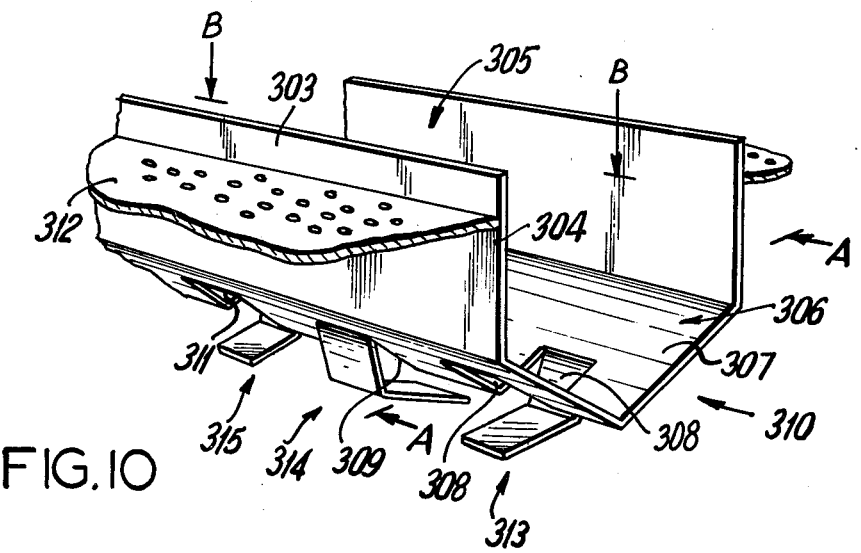
FIG. 10 is a perspective view of a portion of a vapor-liquid contacting tray according to another embodiment of the invention.
Figure 12:
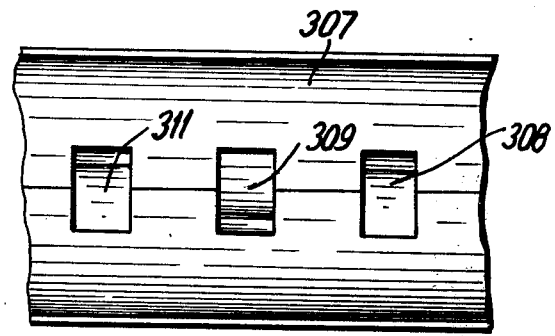
FIG. 12 is a plan view of the downcomer of FIG. 10, taken along line B—B of FIG. 10.

FIG. 10 is a perspective view of still another type of vapor-liquid contacting tray employing liquid discharge means according to the invention. The tray includes perforated plate member 312 and downcomer means 310. The downcomer extends through the tray as the sole liquid transfer means and includes inlet edge means 303 adjacent to a section of the active portion and relatively deep side walls 304 which define a discrete inactive portion of the tray surface area, provide an inlet end section 305 and outlet end section 306. Downcomer 312 also comprises. sloped, floor member 307 having spaced apart spout openings 308, 309 and 311 therein which provide a sealing effect against vapor penetration by a stable head loss of liquid passing therethrough. The spacing of these spout openings is more clearly shown in FIG. 12, which is a plan view of the downcomer of FIG. 10, taken along line A—A of FIG. 10. Lip means 313, 314 and 315 are provided depending downwardly from the floor member 307 and extending transversely beneath spout openings 308, 309 and 311 respectively.

Figure 11:
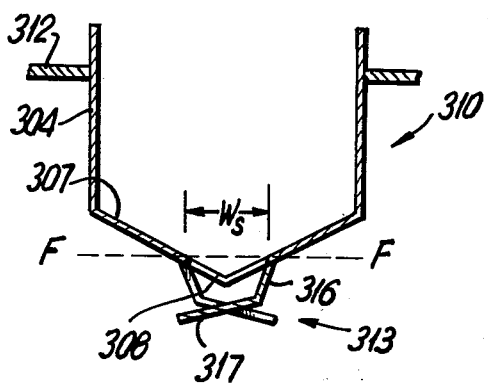
FIG. 11 is an elevational view of the downcomer of FIG. 10, taken along line A—A of FIG. 10.
Figure 13:
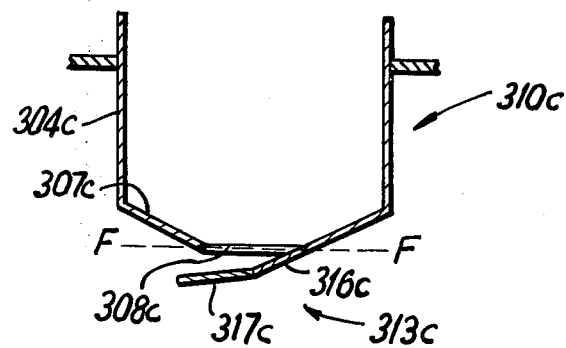
FIG. 13 is a sectional, elevational view of another downcomer embodiment according to the invention.

The construction of the lip means is more clearly shown in the sectional view of FIG. 11, taken along line B—B of FIG. 10. The lip means 313 comprises first and second wall segments 316 and 317 respectively. The first wall segment 316 extends from a portion of the downcomer floor member 307 adjacent the spout opening 308 to an edge at an angle measured with respect to the plane F—F defined by the spout opening 308 of from 30° to 180°. In this embodiment, the floor member 307 is sloped at an angle measured with respect to the plane F—F of about 25°. If the floor member 307 is sloped at an angle sufficient to satisfy the requirements of the first wall segment, as for example at an angle of 30°, a portion thereof can form the first wall segment as shown in the alternative embodiment of FIG. 13. The purpose of the first wall segment 316 is to provide an attachment means that allows unrestricted flow of liquid through the spout opening lying in the plane F—F. The length of the first wall segment is between 0.1 and 0.9 times the width $W_S$ of the spout opening 308. The second wall segment 317 is contiguous with the lower edge of the first wall segment and extends transversely to a terminal edge disposed vertically beneath a second portion of the downcomer floor lying across the spout opening from the first portion of the downcomer floor from which the first segment of the lip means depends. The second wall segment is disposed at an angle measured with respect to the plane defined by the spout openings of from 0° to 35°.

Figure 14:
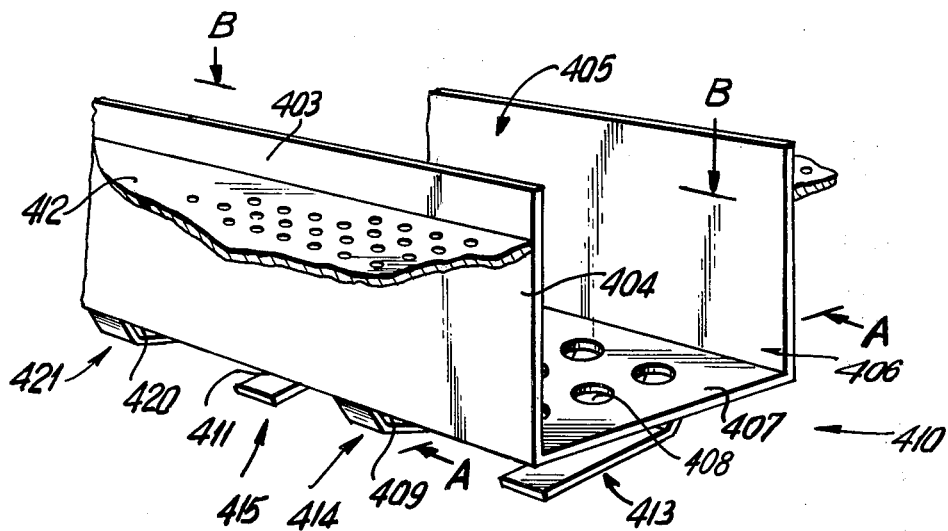
FIG. 14 is a perspective view of a portion of a vapor-liquid contacting tray according to still another embodiment of the invention.
Figure 16:
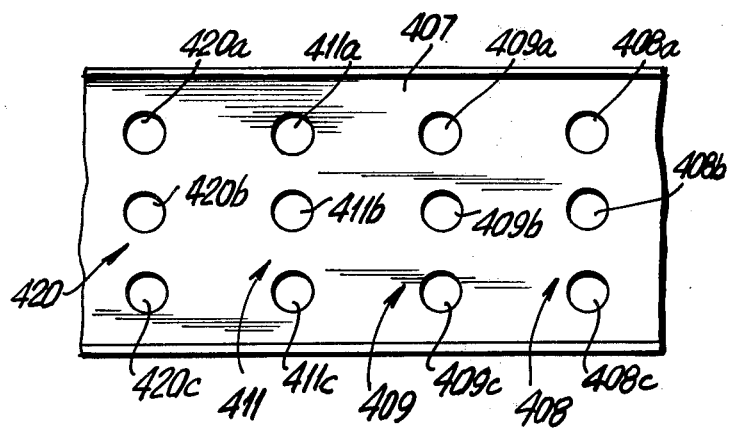
FIG. 16 is a plan view of the downcomer of FIG. 14, taken along line B—B of FIG. 14.

FIG. 14 illustrates another embodiment of this invention featuring the use of a single lip means with a plurality of spout openings. The tray includes perforated tray deck 412 and downcomer means 410. The downcomer comprises inlet edge means 403 adjacent to a section of the active portion and relatively deep side walls 404 which define a discrete inaction portion of the tray surface area, provide an inlet end section 405 and outlet end section 406. The downcomer also includes a horizontally extending floor member 407 having spaced apart groups of spout openings 408, 409, 411 and 420. In this embodiment, each group of spout openings consists of three spouts, for example the set 408 comprises spouts 408a, 408b, and 408c as more clearly shown in FIG. 16, which represents a plan view of the downcomer means of FIG. 14, taken along line A—A of FIG. 14. Each spout opening provides a sealing effect against vapor penetration by the stable head loss of liquid passing therethrough. Lip means 413, 414, 415 and 421 are provided depending downwardly from the floor member 407, respectively extending transversely beneath the groups of spout openings 408, 409, 411 and 420.

Figure 15:
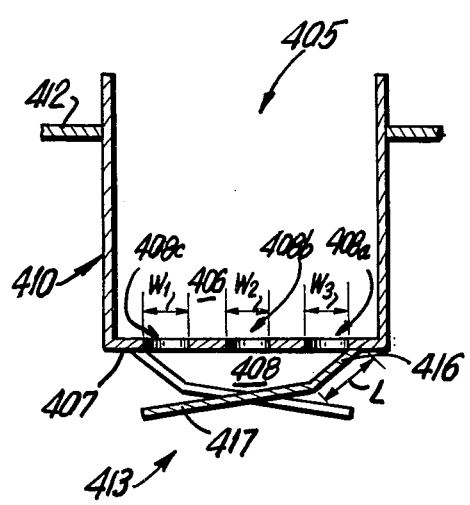
FIG. 15 is an elevational view of the downcomer of FIG. 14, taken along line A—A of FIG. 14.

The design of the lip means is more clearly shown in the sectional view of FIG. 15, which shows the details of the FIG. 14 downcomer, taken along line B—B of FIG. 14. As shown, the lip means 413 comprises first and second wall segments 416 and 417 respectively. The first wall segment 416 is contiguous with a portion of the downcomer floor member 407 adjacent the spout opening 408a and extends to an edge at an angle measured with respect to the plane F—F defined by the group of spout openings 408 of from 30° to 180°. The purpose of the first wall segment 416 is to provide an attachment means that allows unrestricted flow of liquid through the spout openings lying in plane F—F. The length L of the first wall segment is between 0.1 and 0.9 times the aggregate width ($W_1+W_2+W_3$) of the spout openings 408a, 408b and 408c. In this embodiment, the first wall segment is approximately 0.44 times the aggregate width of the spout openings 408a, 408b and 408c. The second wall segment 417 is coextensive with the first wall segment and extends transversely therefrom beneath the spout openings. The second wall segment is disposed at an angle measured with respect to the plane defined by the spout openings of from 0° to 35°.

Figure 17:
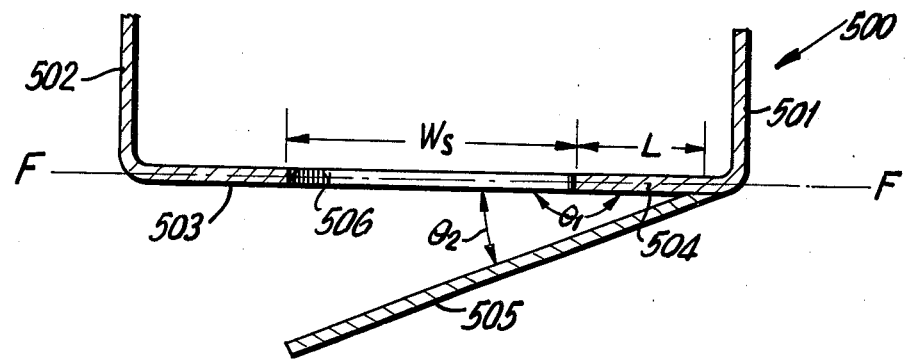
FIG. 17 is a sectional elevational view of the outlet portion of a downcomer constructed in accordance with the invention, according to one embodiment thereof.
Figure 18:
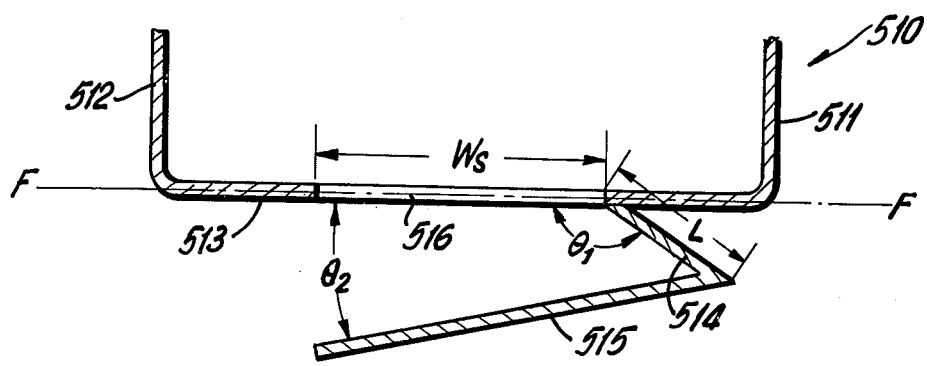
FIG. 18 is a sectional, elevational view of the outlet portion of a downcomer constructed in accordance with the invention, according to another embodiment thereof.
Figure 19:
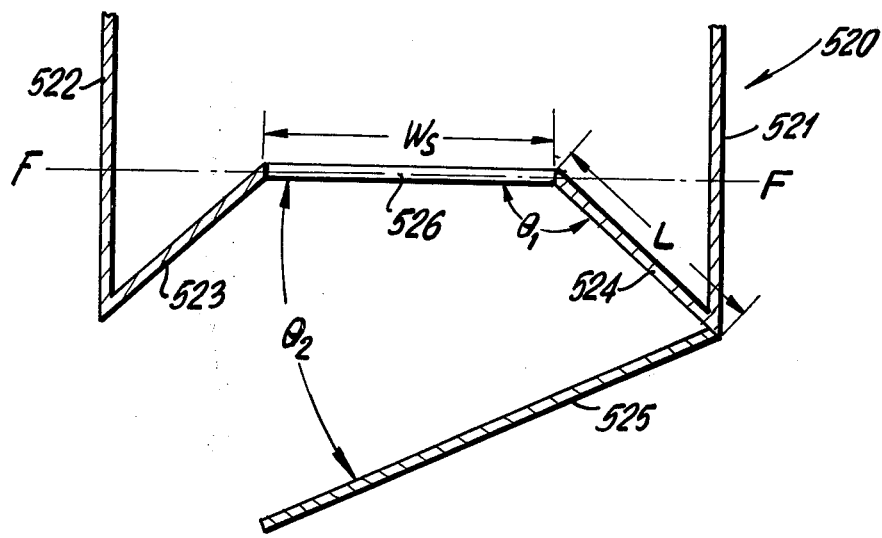
FIG. 19 is a sectional, elevational view of the outlet portion of a downcomer constructed in accordance with the invention, according to still another embodiment thereof.

FIGS. 17-19 show various alternative embodiments of the liquid discharge means constructed in accordance with the present invention. In FIG. 17, the downcomer 500 comprises side walls 501 and 502 and floor member 503. The first wall segment 504 of the lip means is formed by a portion of the floor member 503. The first wall segment of the lip means is disposed adjacent spout opening 506 and extends therefrom to an edge at an angle $\theta_1$ measured with respect to a plane defined by the spout opening 506 of 180°. The first wall segment 504 has a length L of between 0.1 and 0.9 times the width $W_S$ of the spout opening 506 associated with the lip means. The second wall segment 505 is contiguous with and extends from the edge of the first wall segment transversely beneath the spout opening 506 associated with the lip means at an angle $\theta_2$ measured with respect to the plane defined by the spout opening 506 of from 0° to 35°, with the second wall segment being laterally coextensive with the associated spout opening. In FIG. 18, the downcomer 510 has an outlet section as shown which is formed by side walls 511 and 512 and floor member 513. Floor member 513 has a spout opening 516 disposed therein having a width $W_S$. The first wall segment 514 of the lip means has a length L and is disposed at an oblique angle $\theta_1$ with respect to the plane defined by the spout opening 516, F—F, and the second wall segment 515 is contiguous with and extends from the edge of the first wall segment 514 transversely beneath spout opening 516 at an angle $\theta_2$ which is between 0° and 35°. FIG. 19 shows the outlet section of a downcomer 520 having side walls 521 and 522 and downcomer floor member 523. As in the FIG. 17 embodiment, the first wall segment 524 in the FIG. 19 embodiment is formed by a portion of the floor member 523. The first wall segment has a length L and is disposed at an oblique angle $\theta_1$ with respect to the plane F—F defined by the spout opening 526. The spout opening has a width $W_S$. The length L of the first wall segment is between 0.1 and 0.9 times the width of the spout opening $W_S$. Second wall segment 525 is contiguous with and extends from the edge of the first wall segment transversely beneath the spout opening 526 at an angle $\theta_2$ measured with respect to the plane F—F of from 0° to 35°.

Although preferred embodiments have been described in detail, it will be appreciated that other embodiments are contemplated only with modification of the disclosed features, as being with the scope of the invention.

What is claimed is:

1. In a vapor-liquid contacting tray of a type adapted for mounting in a vapor-liquid contacting column having a plurality of such trays vertically spaced apart from one another, which includes: perforated fluid contact means providing an active major portion of the tray surface area to support a two-phase fluid dispersion of vapor in liquid for mass exchange; downcomer means extending through said perforated fluid contact means as the sole liquid transfer means and comprising the minor portion of said tray surface area, each downcomer means comprising (1) inlet edge means adjacent to a section of said active portion (2) imperforate relatively deep side walls which (a) define a discrete inactive portion of the tray surface area, (b) provide an inlet end section for receiving a fraction of said two-phase fluid dispersion and permitting vapor to disengage therefrom, and (c) provide an outlet end section for collecting disengaged liquid and discharging such disengaged liquid from the tray and (3) a floor member attached to said outlet end section having a multiplicity of spaced-apart spout openings therein, so constructed that a sealing effect against vapor penetration may be provided by a stable head loss of liquid passing therethrough such that a pool of disengaged liquid may be maintained in said downcomer means, the improvement comprising lip means associated with said spout openings including a first wall segment disposed adjacent a spout opening and extending therefrom to an edge at an angle measured with respect to a plane defined by the spout openings of from 30° to 180° and with a length of between 0.1 and 0.9 times the width of the spout openings associated with said lip means and a second wall segment contiguous with and extending from said edge of said first wall segment transversely beneath the spout openings associated with said lip means at an angle measured with respect to the plane defined by the spout openings of from 0° to 35°, with said second wall segment being laterally coextensive with said associated spout openings, whereby liquid in said downcomer flowing through said spout openings is vertically damped and given a horizontal velocity component by said lip means for dispersed flow of discharged liquid onto the active portion of tray surface area of an underlying tray.

2. A tray according to claim 1 wherein each lip means is associated with a single spout opening.

3. A tray according to claim 1 wherein said first wall segment of said lip means is formed by a portion of said floor member.

4. A tray according to claim 1 wherein said first wall segment of said lip means depends from said floor member.

5. A tray according to claim 1 comprising at least three narrow, trough-like downcomer means evenly spaced across the tray in parallel relation to each other.

6. A tray according to claim 5 wherein said downcomer means provide 1.0-5.0 downcomer longitudinal inlet edge per square foot of tray surface area.

7. A tray according to claim 5 wherein the imperforate side walls of each of said downcomer means extend vertically upward beyond the tray surface to provice raised inlet weirs.

8. A tray according to claim 5 wherein the width of each of said downcomer means is between about 0.07 and 0.40 of the center-to-center spacing of said downcomer means across the tray.

9. A vapor-liquid contacting column which comprises a plurality of vapor-liquid contacting trays as defined in claim 8 vertically spaced apart such that the downcomer outlet end sections of such tray terminate in the vapor disengagement space of the tray below and wherein adjacent trays are positioned such that their respective downcomer means are horizontally aligned at 90° relative to one another.

10. A tray according to claim 1 wherein the second wall segment of said lip means is perforated with an open area which is less than 0.5 times the open area of the spout openings associated with said lip means.

11. A tray according to claim 1 wherein said angle of said first wall segment is from 30° to 55°, said length of said first wall segment is between 0.1 and 0.5 times the width of said spout openings and said angle of said second wall segment is from 0° to 20°.

12. In a vapor-liquid contacting tray of a type adapted for mounting in a vapor-liquid contacting column having a plurality of such trays vertically spaced apart from one another, which includes: perforated fluid contact means providing an active major portion of the tray surface area to support a two-phase fluid dispersion of vapor in liquid for mass exchange; and at least three narrow, trough-like downcomer means evenly spaced across the tray in parallel relation to each other and extending through said perforated fluid contact means as the sole liquid transfer means and comprising the minor portion of said tray surface area such that said fluid contact means is divided into sections of substantially equal surface area per unit length of adjacent downcomer means, each donwcomer means comprising (1) two spaced longitudinal inlet edges each adjacent to a section of said active portion and extending across the tray, (2) imperforate relatively long and deep longitudinal side walls and imperforate relatively short transverse end walls which (a) define a discrete inactive portion of the tray surface area, (b) provide an inlet end section for receiving a fraction of said two-phase fluid dispersion and permitting vapor to disengage therefrom, and (c) provide an outlet end section for collecting disengaged liquid and discharging such disengaged liquid from the tray and (3) a horizontally extending floor member attached to said outlet end section having a multiplicity of spaced-apart spout openings therein so constructed that a sealing effect against vapor penetration may be provided by a stable head loss of liquid passing therethrough such that a pool of disengaged liquid may be maintained in said downcomer means, the improvement comprising lip means associated with said spout openings including a first wall segment contiguous with and extending from a first portion of said downcomer floor member adjacent a spout opening to an edge at an angle measured with respect to a plane defined by the spout openings of from 30° to 180° and with a length of between 0.1 and 0.9 times the width of the spout openings associated with said lip means and a second wall segment contiguous with and extending from said edge of said first wall segment transversely beneath the spout openings associated with the lip means to a terminal edge disposed vertically beneath a second portion of said downcomer floor member located transversely across said spout openings from said first portion of said downcomer floor member at an angle measured with respect to said plane defined by the spout openings of from 0° to 35°, with said second wall segment being laterally coextensive with said associated spout openings, whereby liquid in said downcomer flowing through said spout openings is vertically damped and given a horizontal velocity component by said lip means for dispersed flow of discharged liquid onto the active portion of tray surface area of an underlying tray.

13. A tray according to claim 12 wherein each lip means is associated with a single spout opening.

14. A tray according to claim 12 wherein the first wall segment of said lip means is integral with said first portion of said downcomer floor member, and said spout openings are of fixed size.

* * * * *